B. E. DENSON.
TRACTION-INCREASING DEVICE.
APPLICATION FILED MAY 27, 1922.
1,430,291.
Patented Sept. 26, 1922.
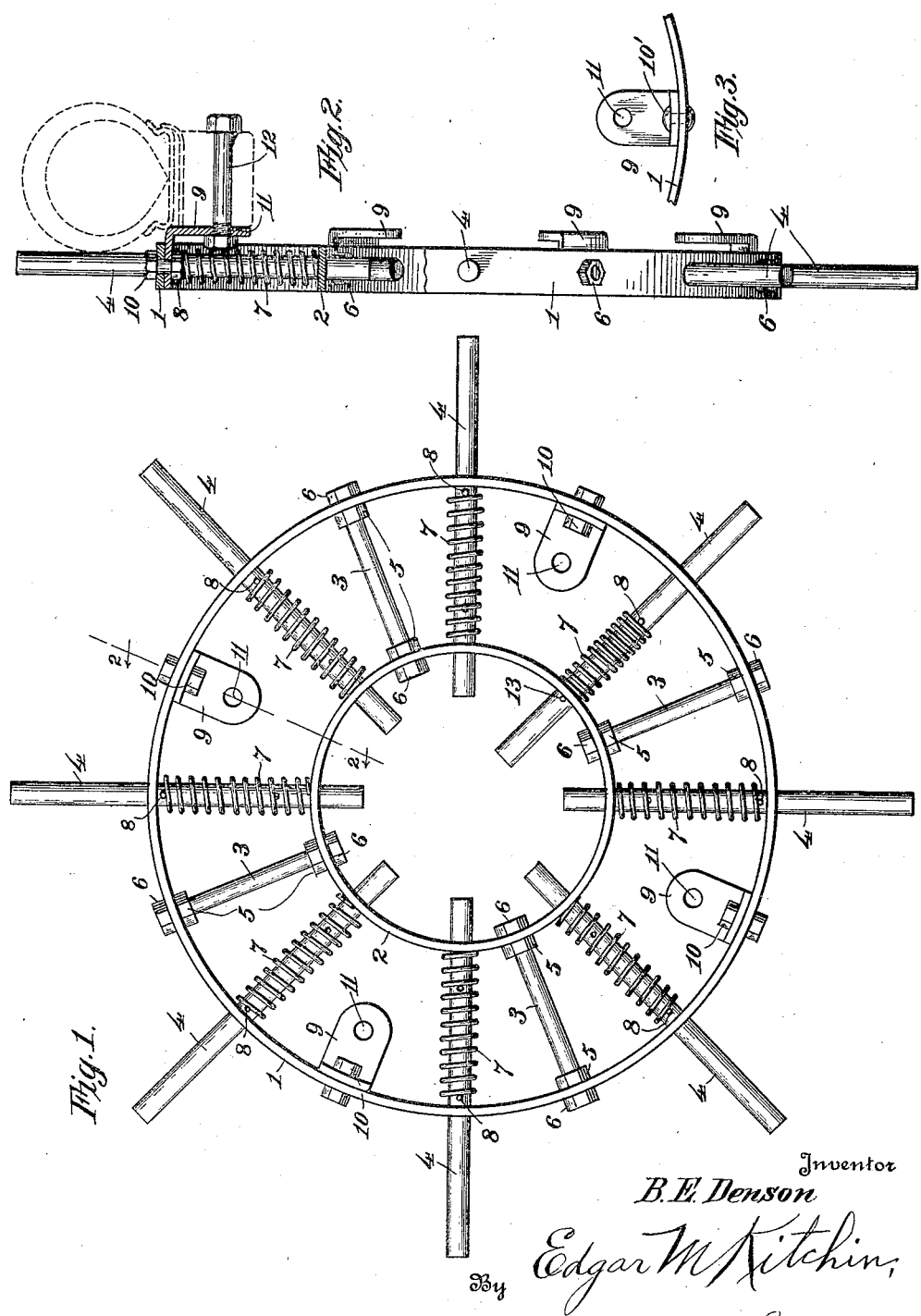

Patented Sept. 26, 1922.

1,430,291

UNITED STATES PATENT OFFICE.

BENJAMIN E. DENSON, OF COLUMBUS, GEORGIA.

TRACTION-INCREASING DEVICE.

Application filed May 27, 1922. Serial No. 564,048.

*To all whom it may concern:*

Be it known that I, BENJAMIN E. DENSON, a citizen of the United States, residing at Columbus, in the county of Muscogee and State of Georgia, have invented certain new and useful Improvements in Traction-Increasing Devices; and I do hereby declare the following to be a full, clear, and exact description of the invention, such as will enable others skilled in the art to which it appertains to make and use the same.

This invention relates to improvements in non-skidding devices for automobiles and other vehicle wheels, and has as its primary object the effective increase of traction by apparatus susceptible of manipulation for relieving the increased traction when not required.

With this and other objects in view, as will in part hereinafter become apparent and in part be stated, the invention comprises certain novel constructions, combinations, and arrangements of parts as will be subsequently specified and claimed.

In the accompanying drawing—

Fig. 1 is a view in side elevation of an apparatus embodying the features of the present invention.

Fig. 2 is an edge view thereof, a dotted section of wheel being indicated for disclosing the relative location of parts.

Fig. 3 is a detail, fragmentary view of a slightly modified embodiment.

Referring to the drawing by numerals, 1 indicates an outer ring, and 2 an inner ring connected by radial stay bolts 3, 3 and forming a supporting and guiding framework for radially movable pins or spikes, 4, 4. Each of the bolts 3 is preferably provided with nuts 5, 5, engaging respectively the outer periphery of the inner ring 2 and the inner periphery of the outer ring 1. Complemental nuts 6, 6 engage respectively the inner and outer end portions of each bolt 3 and clamp the rings in a rigid relation to each other.

Each spike 4 is passed through and slidingly mounted in both of the rings 1 and 2. Between rings 1 and 2, each spike is surrounded by a coil spring 7, having its inner end engaging the outer periphery of ring 2 and its outer end engaging a cross-pin 8 extending through or otherwise appropriately engaging the respective spike 4, whereby the spike is maintained under the radial outward stress of its spring, which stress is increased with an inward thrust or sliding movement of the spike.

Appropriately spaced about the outer ring 1 are wheel-engaging brackets 9. Each bracket 9 consists of an angle plate having one of the webs of the angle bolted at 10 to the ring 1, and the other web extending radially inward and formed with an aperture 11 for the receipt of a retaining bolt 12 projecting from the side of the felloe of the wheel to which the apparatus is attached, each bracket 9 having its outstanding web, which is engaged by bolt 10, of sufficient length to allow rings 1 and 2 to outstand sufficiently from the face of the wheel engaged to permit the spikes 4 to extend past the contiguous side of the elastic tire of the wheel.

In operation, the parts being bolted in place, as indicated in Figure 2, the spikes 4 successively strike the ground, as the engaged wheel revolves, and successively move radially inward against the tension of the respective springs, and then again spring outward as soon as they pass the point of contact with the ground. The spikes 4 are preferably in sufficient number to insure at least one spike constantly in contact with the ground. Thus, any skidding stress will be exerted against the spike or spikes in engagement with the supporting surface on which the wheel is running, and as the spikes are of a metal or other appropriate substance designed to insure increased traction by increased friction, the tendency towards skidding is largely eliminated.

It will be recognized, of course, that when the ground is dry or conditions otherwise obviate the need for increased traction, the spikes may be located in a position for being free from contact with the supporting surface. To effect this result, it is preferable to provide each spike 4 with an aperture 13 at its inner portion so located that when the spike is slid radially inward by manual stress or otherwise until the aperture 13 is exposed within the ring 2, and a cotter pin or other proper detent is passed through or into the aperture 13, the respective spike will be thereby held against outward radial movement, and the inner location is such as to bring the outer end of the spike sufficiently within the ring described by the periphery of the tire of the engaged wheel to insure freedom from contact of the spike with the ground during operation. When all of the spikes are thus located in their inner position, the device will be out of action. The operator may, by withdrawing the pins from the apertures 13, place the device in condition for action, and by replacing the pins remove it from action so as to control the functioning of the device while applied to the wheel. On the other hand, if for any reason, the operator should desire to discontinue the use of the device altogether, all that he needs to do is to remove bolts 10 and withdraw the apparatus laterally away from the wheel.

In Figure 3 is illustrated a slightly modified form of connection of the ring 1 with its angle brackets 9. A rivet 10' is employed for connecting each bracket 9 to ring 1 in this embodiment, so that the brackets are permanently mounted on the ring. In this form of apparatus, to remove the entire device it is necessary to take off the nuts from the several bolts 12 and the brackets 9 are withdrawn from the projecting ends of bolts 12.

It will be observed by those familiar with the art that when the elastic tire, or the tire with its demountable rim, is to be removed from the wheel to which the present improved traction device is attached, the device must be removed first, and to provide clearance it will be usually necessary to remove the nuts from bolts 12 and withdraw the device with the brackets 9 attached whether of the form shown in Figure 1 or in Figure 3. It is not intended that the ring 1 should at any time carry any of the weight of the vehicle, and in case the device is applied to a wheel having a pneumatic tire, when such tire becomes deflated as from a puncture or blow-out, the parts are so proportioned as to cause the load stresses to be sustained by the carrying wheel, and no part of them to be sustained by the ring 1. The present improved traction device will be made in different sizes, according to the wheels to which it is to be attached, and in each instance the ring 1 is preferably made of a diameter sufficiently less than the load carrying parts of the wheel engaged to insure against any load stresses (except skidding and pull) being delivered to the ring 1. To this end, the ring is preferably substantially of the same diameter as the felloe band or fixed rim of the wheel, but may be of slightly greater or slightly less diameter so long as it is of sufficient size to provide the requisite support for the spikes or pins 4 without at the same time having the ring exposed beyond the metal parts of the wheel engaged.

The apparatus thus described is not only useful and valuable for increasing the traction and decreasing the liability to skid on wet streets and under other like circumstances, but is also valuable for materially aiding in driving along muddy roads.

What is claimed is:—

1. A traction increasing device for elastically-tired wheels comprising a frame, radially movable pins sustained thereby, and cushioning means stressing the pins toward the position for engaging the ground, each pin being formed with an aperture so located as to receive a detent for locking the pin out of ground-engaging position.

2. A traction increasing device for elastically-tired wheels comprising a frame, radially movable pins sustained thereby, a spring coiled about each pin and engaging the pin for stressing the same toward the ground engaging position, and means for locking the pins under spring tension out of ground-engaging position.

3. A traction increasing device for elastically-tired wheels comprising concentric spaced rings, means rigidly connecting the rings, means for detachably connecting the rings to a wheel, radially-disposed pins slidingly mounted in the rings for moving to and from a ground-engaging position, cushioning means stressing the pins toward such ground-engaging position, and means for locking the pins in their inner or ground-non-engaging position.

In testimony whereof I affix my signature in presence of two witnesses.

BENJAMIN E. DENSON

Witnesses:
 WM. F. DENSON,
 S. M. DAVIS.